United States Patent [19]

Hattori

[11] Patent Number: 4,758,211
[45] Date of Patent: Jul. 19, 1988

[54] V BELT FOR POWER TRANSMISSION

[75] Inventor: Torao Hattori, Saitama, Japan

[73] Assignee: Honda Giken Kogyo Kabushiki Kaisha, Tokyo, Japan

[21] Appl. No.: 944,579

[22] Filed: Dec. 22, 1986

[30] Foreign Application Priority Data

Dec. 25, 1985 [JP] Japan .............................. 60-202221[U]
Mar. 10, 1986 [JP] Japan .............................. 61-34092[U]
Mar. 14, 1986 [JP] Japan .............................. 61-56556

[51] Int. Cl.$^4$ ............................................. F16G 5/16
[52] U.S. Cl. ..................................... 474/242; 474/201
[58] Field of Search ............... 474/201, 240, 242, 244, 474/245, 246

[56] References Cited

U.S. PATENT DOCUMENTS

| | | | |
|---|---|---|---|
| 4,371,361 | 2/1983 | Giacosa | 474/201 |
| 4,457,742 | 7/1984 | Hattori et al. | 474/201 |
| 4,507,106 | 3/1985 | Cole, Jr. | 474/245 X |
| 4,512,753 | 4/1985 | Hattori | 474/242 |
| 4,552,548 | 11/1985 | Hattori | 474/201 |

FOREIGN PATENT DOCUMENTS

| | | |
|---|---|---|
| 144843 | 8/1984 | Japan . |
| 101337 | 6/1985 | Japan . |
| 79038 | 6/1985 | Japan . |
| 101245 | 7/1985 | Japan . |

*Primary Examiner*—Thuy M. Bui
*Attorney, Agent, or Firm*—Irving M. Weiner; Joseph P. Carrier; Pamela S. Burt

[57] ABSTRACT

A V belt (1; 201) for power transmission to be stretched over a driving pulley (100) and a driven pulley to effect power transmission therebetween, the V belt comprising a looped metallic belt (2), a plurality of V-shaped metallic blocks (3; 203) fitted on the metallic belt in a continuous manner along the length of the metallic belt, and a plurality of stoppers (5; 75) each respectively applied to one of the V-shaped blocks to cooperate with a concave groove (3b; 203b) of the V-shaped block so as to surround the metallic belt. At least a part (5d; 75d) of a base portion (5a; 75a) of the stopper is curved in a radial direction of the V belt to permit a resilient uniform opening of both side portions (5b; 75b) thereof in lateral directions (Y). The V belt further comprises a plurality of rollers (4) each respectively disposed between neighboring two of the V-shaped blocks; the V-shaped blocks include a number of V-shaped blocks (3x, 3y) falling into at least two types having their minimum longitudinal thicknesses ($l_2$, $l_3$) different from each other; and V-shaped blocks (3y) of at least either type each have a marking (3i, 3j; 3k) visually identifiable from outside of the V belt. The V belt (201) further includes a plurality of rollers (4) disposed between the V-shaped blocks, respectively, and the V-shaped blocks (3, 203) include a number of V-shaped blocks (203) of another type each having at either side of the V belt a convex part (203e) playing the role of a roller.

9 Claims, 4 Drawing Sheets

V BELT FOR POWER TRANSMISSION

BACKGROUND OF THE INVENTION

1. Field of the Invention

The present invention relates generally to a V belt for power transmission for use such as in a stepless speed change gear for vehicles. More particularly, the present invention relates to a V belt for power transmission of a type including a looped metallic belt, a plurality of V-shaped metallic blocks arranged in a continuous manner along the length of the metallic belt and each fitted at a radially outer concave groove thereof on the metallic belt, from inside in the radial direction, to be brought into engagement with the V-shaped grooves of driving and driven V-pulleys, and a plurality of stoppers each fitted from outside in the radial direction of the metallic belt on one of the V-shaped blocks, to secure the block to the metallic belt, respectively.

2. Description of Relevant Art

Recently, as a V belt for power transmission for use such as in a stepless speed change gear for vehicles, there have been proposed V belts for power transmission which include a looped metallic belt, a plurality of V-shaped metallic blocks arranged in a continuous manner along the length of the metallic belt and each fitted at a radially outer concave groove thereof on the metallic belt, from inside in the radial direction, and a plurality of stoppers each fitted from outside in the radial direction of the metallic belt on one of the V-shaped blocks, to secure the block to the metallic belt, respectively. In applications in which such type of V belt is stretched over driving and driven V-pulleys, the V-shaped blocks conveniently engage, as they come into contact, with the V-shaped grooves of the V-pulleys.

As an example, there is a V belt disclosed in a utility model application of the present applicant, laid open June 1, 1985 by Japanese Utility Model Application Laying-Open Gazette No. 60-79038. This V belt further includes a plurality of cylindrical rollers each respectively intervening between neighboring two of the V-shaped blocks. These blocks are each formed at the front and rear faces thereof in respect of the advance direction of the V belt with a pair of oppositely arranged semi-cylindrical concave places for receiving to hold corresponding two of the rollers, respectively. Each roller has its axis oriented in the width direction of the V belt.

Figure 13:
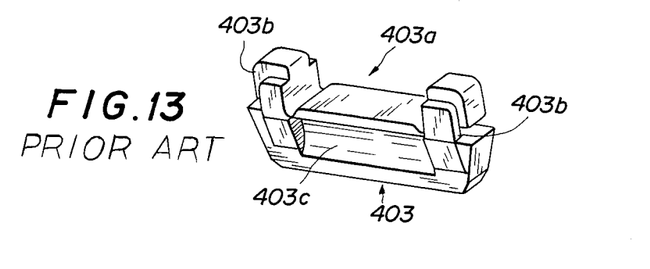
FIGS. 13 and 14A, 14B are illustrations showing a V-shaped block and stoppers in relation to a conventional V belt, as described.
Figure 14A:
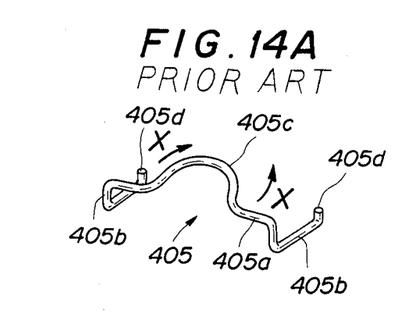

The V-shaped blocks and the stoppers of this V belt are all configured as illustrated in FIGS. 13 and 14A of the accompanying drawings, respectively. As shown in FIG. 13, each V-shaped block 403 has a concave groove 403a formed in the radially outer part thereof to be fitted on the metallic belt, from inside in the radial direction, one of the semi-cylindrical concave places 403c at the front part thereof to receive a corresponding one of the rollers as well as the other (not shown) of same at the rear part thereof, and a pair of substantially L-shaped grooves 403b, 403b in the left and right shoulder parts thereof, respectively, to secure a corresponding one of the stoppers. In the L-shaped grooves 403b, 403b, left and right L-shaped parts 405b, 405b of the stopper 405 made of a round bar material as shown in FIG. 14A are inserted to be fixed. The L-shaped parts 405b, 405b have their end parts 405d, 405d bent to be outwardly oriented in the radial direction of the V belt, when fixed. A widthwise intermediate part 405c of a bridging base portion 405a of stopper 405 is curved in either sense of the length direction of the V belt, to thereby provide a resilient nature. It thus is easy to make the stopper 405 resiliently deform at the base portion 405a to open in a uniform manner in such longitudinal directions of the V belt as shown by arrows X in FIG. 14A. It is, however, relatively difficult to resiliently deform the stopper 405 such that it is uniformly opened with the L-shaped parts 405b, 405b spread in lateral directions of V-shaped block 403. Moreover, the stopper 405 with the L-shaped parts 405b, 405b is rather complicated in configuration. As a result, a straight-forward application of stopper 405 to V-shaped block 403 from outside in the radial direction has been difficult.

Figure 14B:
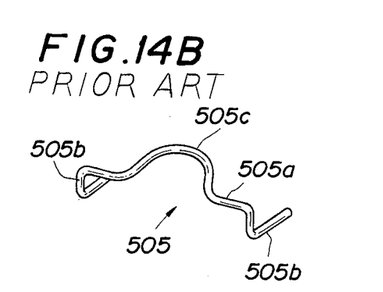

For a stopper 505 with such a configuration as shown in FIG. 14B, its application to the V-shaped block 403 would be possible from ahead thereof, without its having to be laterally opened with the L-shaped parts 505b, 505b spread. In this respect, the stopper 405 of FIG. 14A has the bent parts 405d, 405d which constitute an obstacle, whereby its insertion into the L-shaped grooves 403b, 403b of V-shaped block 403 is difficult to be made from ahead without laterally opening same. The stopper 505 of FIG. 14B may be made of a round bar material. Also, its base portion 505a has a widthwise intermediate part 505c thereof curved in the length direction of the V belt, if applied. Thus, it would still be difficult to make the stopper 505 uniformly open in a resilient manner with the L-shaped parts 505b, 505b spread in lateral directions of the V-shaped block 403. Moreover, the application of stopper 505 from ahead to V-shaped block 403 would require two steps such that the stopper 505 should be inwardly brought in place from outside in the radial direction of the V belt before it is inserted into the L-shaped grooves 403b, 403b by its translation in the length direction of the V belt. It would thus be difficult to make a concurrent multiple application of a plurality of stoppers 505 to a plurality of V-shaped blocks 403 which are arranged adjacent to each other along the metallic belt. As a result, the fabrication process may be complicated. Further, because the stopper 505 lacks bent end parts, such as parts 405d, it would always have associated therewith the unfavorable possibility of coming out of place while the V belt is running. This is true even if it was designed to be clamped on the V-shaped block 403 as firmly as possible. Accordingly, there is a desideratum to be achieved to possibly facilitate the application of a stopper to a V-shaped block, preferably in a multiplicable manner. More generally, a facilitation in assembly work of V belt is desired.

The present applicant has disclosed, in a utility model application laid open July 10, 1985 by Japanese Utility Model Application Laying-Open Gazette No. 60-101245, a V belt for power transmission of a type similar to that according to the Laying-Open Gazette No. 60-79038, though the former includes a stopper held between shoulder parts of a V-shaped block. This stopper also has a widthwise intermediate part of a base portion thereof curved in the length direction of the V belt. Thus, also the V belt according to the Laying-Open Gazette No. 60-101245 has like problems on assembly work to that according to the Laying-Open Gazette No. 60-79038.

Incidentally, in such a type of V belt for power transmission as proposed in the aforementioned Gazettes, for a given length of a looped metallic belt with given numbers of V-shaped blocks and rollers, the blocks and rollers in a loop have a total play in dependence on the summation of the outside diameter of the respective rollers and the summation of the distance between the deepest part of a front concave place and that of a rear concave place (hereinafter called "minimum longitudinal thickness") of the respective blocks. The tension of the metallic belt depends on this play. Exemplarily, the metallic belt has a greater tension as the play becomes smaller. The total play is required to have a predetermined value, of which the setting is possible by adjusting the outside diameter of the rollers and the minimum longitudinal thickness of the blocks. In this respect, the V belt according to the Laying-Open Gazette No. 60-101245 uses V-shaped blocks of a kind having a predetermined minimum longitudinal thickness and rollers of three different outside diameters to obtain a proper play. More particularly, the rollers are sized into three groups: one including standard rollers having a predetermined standard outside diameter, and the remaining two including rollers smaller and larger by 0.1 mm (for example) in outside diameter than the standard rollers, respectively. Those rollers are designed for a mass production at low cost with a manufacturing tolerance of outside diameter within approximately two microns.

In the described type of V belt, the metallic belt has an increased length with time of use of the V belt, depending on its metallurgical properties. However, the outside diameter of the rollers as well as the minimum longitudinal thickness of the V-shaped blocks is almost unchanged with the time of use of V belt. As a result, the total play of the looped blocks and rollers increases, thus causing the tension of the metallic belt to be reduced from an initially set value. Using a V belt of such state may provide a power transmission gear, a stepless speed change gear for vehicles in this case, with a tendency to malfunction or produce noises. It thus becomes necessary to disassemble such V belt to adjust the total play of block-and-roller loop and then reassemble same.

The disassembly and reassembly work may follow various known methods, which are all complicated. For example, in the case of the V belt according to the Laying-Open Gazette No. 60-101245, the standard rollers are to be replaced, some with rollers smaller by 0.1 mm in outside diameter and some with rollers having a 0.1 mm larger outside diameter. Such practice requires the respective rollers to be measured for outside diameter one by one after disassembly of the V belt. It is possible to include size indication marks on the rollers and eliminate the measurement step. However, the rollers are smaller than the V-shaped blocks and interposed therebetween, so that even if they had their size indication marks put thereon it would be difficult to visually identify them from outside. For such reason, there is a desideratum for a facilitation of V belt disassembly and reassembly work in conjunction with necessary repairing for adjusting the total play of a block-and-roller loop which may be increased due to extension of the metallic belt with time of use of the V belt. Like desideratum may well apply to the factory adjustment of the total play of the block-and-roller loop in the initial fabrication of the V belt. Therefore, from such point of view as well, a facilitation in assembly work of the V belt is desired.

With such desiderata in mind, the present invention has been achieved to the problems and disadvantages associated with give an effective solution to conventional V belts for power transmission.

SUMMARY OF THE INVENTION

An object of the present invention is to provide a V belt for power transmission in which facilitations are achieved in the application of stoppers to V-shaped blocks and hence in the assembly work.

Another object of the present invention is to provide a V belt for power transmission of which the disassembly and reassembly can be facilitated, such as in repairing for adjustment to an increased total play of a block-and-roller loop due to extension of a metallic belt with time of use, as well as in factory adjustment of the total play of the block-and-roller loop in the initial fabrication process.

Still another object of the present invention is to provide a V belt for power transmission which has a reduced number of component parts to thereby further facilitate the assembly work.

To achieve such objects, the present invention provides a V belt for power transmission to be stretched over a driving pulley and a driven pulley to effect power transmission therebetween, the V belt comprising a looped metallic belt, a plurality of V-shaped metallic blocks fitted on the metallic belt in a continuous manner along the length of the metallic belt, the V-shaped blocks each having at the upper part thereof a concave groove radially outwardly opening toward the V belt so that the metallic belt faces thereon, and a plurality of stoppers each having a base portion extending widthwise of the V belt and side portions radially inwardly extending either at each side of the base portion, the stoppers each respectively being applied by both side portions thereof to one of the V-shaped blocks at an outer place of the metallic belt to cooperate with the concave groove of the V-shaped block so as to surround the metallic belt, wherein at least a part of the base portion of each stopper is curved in a radial direction of the V belt to permit a resilient uniform opening of both side portions thereof in lateral directions.

In a preferred embodiment, the V belt further comprises a plurality of rollers each respectively disposed between one of the V-shaped blocks and another of the V-shaped blocks adjacent thereto at the radially inner side of the loop of the metallic belt, each V-shaped block has concave places formed to receive the roller at either the front or rear thereof in the length direction of the V belt, respectively. Also, the V belt includes at least two types of V-shaped blocks, a first type which has a first predetermined dimension as the distance between the deepest parts of the respective concave places thereof and a second type which has a second predetermined dimension as the distance between the deepest parts of the respective concave places thereof. Further, each V-shaped block of the first type and each V-shaped block of the second type being provided at least either with a marking visually identifiable from outside.

In another preferred embodiment, the V belt may include on the one hand a number of V-shaped blocks of a type each having, on front and rear faces thereof in the length direction of the V belt, concave places located radially inside of the metallic belt, respectively, and on the other hand a number of V-shaped blocks of a type each having, on one face thereof in the length direction of the V belt, a concave place located radially inside of the metallic belt and, on the other face thereof in the length direction of the V belt, a convex part located radially inside of the metallic belt, a plurality of rollers each respectively disposed between the concave place of one of the V-shaped blocks of the latter type and one of the concave places facing thereto of a corresponding one of the V-shpaed blocks of the former type, and the convex part of each of the V-shaped blocks of the latter type engages with one of the concave places facing thereto of a corresponding one of the V-shaped blocks of the former type.

The above and further features, objects and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
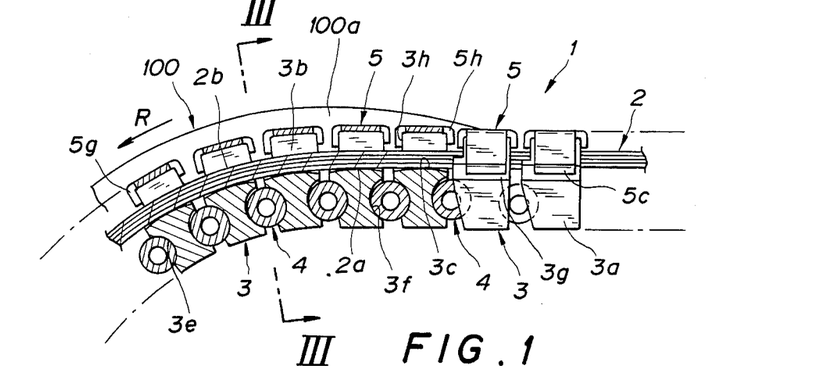
FIG. 1 is a partially cutaway side view of a part of a V belt for power transmission according to an embodiment of the present invention, as it is brought into engagement with a driving pulley.
Figure 2:
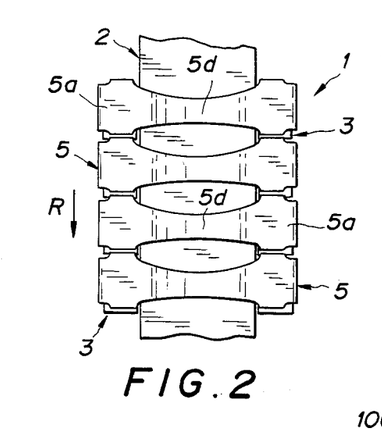
FIG. 2 is a partial plan view of the V belt.
Figure 3:
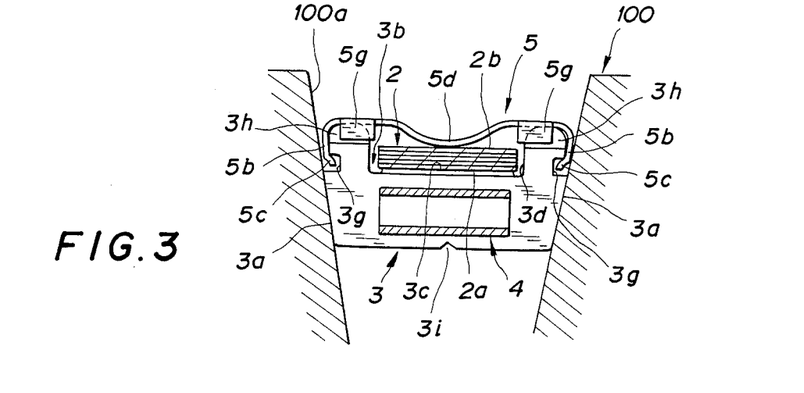
FIG. 3 is a sectional view along line III—III of FIG. 1.

Referring to FIGS. 1 to 3, designated at reference numeral 1 is a V belt for power transmission according to the present invention, the V belt 1 being stretched over a driving pulley 100 of an unshown stepless speed change gear for vehicles, which rotates in the direction of arrow R, and an unshown driven pulley, to effect power transmission therebetween. Hereinafter, the direction R and the opposite direction thereto will be referred to collectively as longitudinal and individually as frontward and rearward, respectively, while the upward and downward directions in FIG. 1, as will be referred to as radially outward or simply as outward and as radially inward or simply as inward, respectively, or sometimes by intuitive expressions. Moreover, the right-hand and left-hand directions in FIG. 2 will be called collectively as transverse and individually as leftward and rightward, respectively, or by other like terms. The V belt 1 comprises a looped metallic belt 2 composed of a plurality of laminated belt members of hoop steel, and a plurality of V-shaped sintered metallic blocks 3 fitted on the metallic belt 2 so as to be continuous along the length of the belt 2. Preferably, the number of the hoop steel belt members is within a range of 9 to 15. Each V-shaped block 3 has at both sides thereof a pair of surfaces 3a, 3a inclined to enage, as they come into contact, with a V-grooved face 100a of pulley 100 and at the upper surface thereof a wide concave groove 3b on which the metallic belt 2 faces. The concave groove 3b opens outwardly of the loop of belt 2. A radially inner side 2a of the metallic belt 2 abuts on a radially outer side 3c of the concave groove 3b, as the V belt 1 wedges into pulley 100.

Between an arbitrary one of V-shaped blocks 3 and each block adjacent to there is disposed a cylindrical roller 4, radially inside of the loop of belt 2. The roller 4 has its axis oriented transversely of V belt 1. Each one of V-shaped blocks 3 has at the front and rear faces thereof, with respect to the advance direction of V belt 1, a pair of semi-cylindrical concave places 3e, 3f formed therein, respectively, to thereby receive to hold corresponding ones of rollers 4. The number of rollers 4 is equal to that of V-shaped blocks 3, as a whole. By the provision of rollers 4, any neighboring two of V-shaped blocks 3 are restricted in relative transverse movement therebetween. To obtain such effect, the number of V-shaped blocks 3 as well as that of rollers 4 is set within a range of 100 to 150 for a typical case. The roller receiving concave place 3e at the front of block 3 has a substantially equal radius of curvature to roller 4, and the roller receiving concave place 3f at the rear of block 3 has a larger radius of curvature than roller 4. Each V-shaped block 3 has a stopper 5 attached thereto outside of metallic belt 2, which stopper 5 cooperates with the concave groove 3b to envelop the belt 2 to thereby check the block 3 from coming out of place on belt 2. The stopper 5 is a pressed mold of a steel sheet material.

Figure 4:
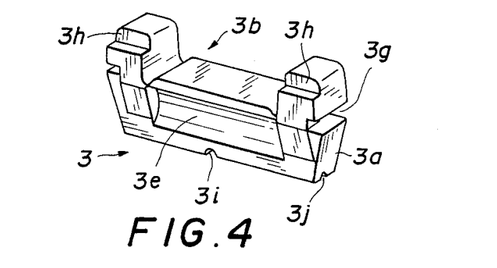
FIG. 4 is a perspective view of a V-shaped block of the V belt.

As better shown in FIG. 4, each V-shaped block 3 has at both side faces thereof a pair of longitudinal locking slots 3g, 3g formed therein right above the inclined surfaces 3a, 3a, respectively, along the longitudinal width of block 3. The slots 3g, 3g have upper sides thereof at an inner position relative to a radially outer side 2b of metallic belt 2. Shoulder parts of V-shaped block 3 are formed at the front thereof with stepped parts 3h, 3h, respectively, and chamfered along both side edges of the respective top faces thereof.

Figure 5:
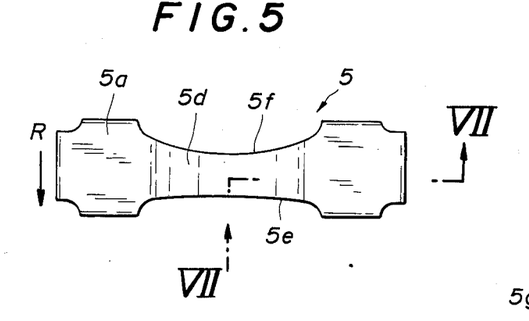
FIGS. 5 and 6 are plan and side views of a stopper of the V belt and FIG. 7 is a front view of same, partly in section along line VII—VII of FIG. 5, respectively.
Figure 6:
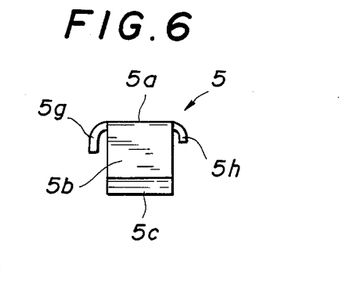
Figure 7:
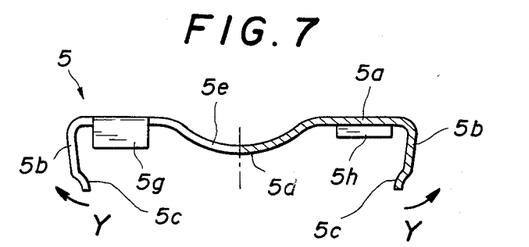

Referring now to FIGS. 5 to 7, the stopper 5 comprises a bridging base plate 5a of which the longitudinal width is substantially the same as that of V-shaped block 3 and the transverse width is smaller than the maximum transverse width of block 3. The base plate 5a is provided with a pair of radially inwardly extending side portions 5b, 5b at the left and right ends thereof, respectively, the side portions 5b, 5b being formed with transversely inwardly bent curved parts 5c, 5c at the lower ends thereof, respectively. The side portions 5b, 5b have a slightly smaller longitudinal width than the shoulder parts of V-shaped block 3. A transversely intermediate part 5d of the base plate 5a is moderately curved to be bulged in the radially inward direction of V belt 1 to thereby effectively produce a resilient tendency. As a result, the base plate 5a is easy to resiliently deform to uniformly open in the vertical direction of V-shaped block 3, such that it is facilitated to give a resilient deformation to have the side portions 5b, 5b uniformly spread in lateral directions as shown by arrows Y in FIG. 7. In other words, the curved intermediate part 5d resiliently permits a uniform lateral opening of both side portions 5b, 5b. Moreover, at the front and rear of the intermediate part 5d there are formed curvilinearly cut edge parts 5e, 5f, respectively, so that the longitudinal width of stopper 5 becomes smallest at the transversely central part. Also, the curvilinear edge parts 5e, 5f contribute to the facilitation of the resilient opening of side portions 5b, 5b in lateral directions of V-shaped block 3. The base plate 5a has at the front edge thereof left and right radially inwardly bent parts 5g, 5g with a relatively small length and at the rear edge thereof left and right radially inwardly bent parts 5h, 5h with a smaller length than the front bent parts 5g, 5g. When fitted on V-shaped block 3, the stopper 5 has the lower end curved parts 5c, 5c of side portions 5b, 5b snapped into the locking slots 3g, 3g of both side faces of block 3, the front small bent parts 5g, 5g fitted to the stepped parts 3h, 3h of the front face of block 3, and the rear small bent parts 5h, 5h slid onto the rear face of block 3, at both shoulder parts thereof, respectively. As shown in FIG. 7, the stopper 5 is shaped in a transversely spread M-form in front view.

Referring again to FIG. 3, the curved intermediate part 5d of stopper 5 faces on the radially outer side 2b of metallic belt 2, when the V belt 1 is assembled or in use. The intermediate part 5d is radially inwardly curved so that its lower surface almost contacts with the outer side 2b of metallic belt 2 in such situation. Namely, the distance between the lower surface of intermediate part 5d and the outer side 2b is very small. In use, therefore, when metallic belt 2 is radially outwardly urged relative to the concave groove 3b of V-shaped block 3, the outer side 2b abuts on the intermediate part 5d of stopper 5, exerting forces to push it up. As a result, resilient deformation of intermediate part 5d causes the lower end parts 5c, 5c of side portions 5b, 5b to be forced farther into the locking slots 3g, 3g of block 3, with an increased securing tendency than in the state of FIG. 3. Thus, when the metallic belt 2 is radially outwardly displaced, the tendency to secure the stopper 5 to the V-shaped block 3 becomes all the more strong.

As described, both side portions 5b, 5b of stopper 5 are easy to resiliently uniformly open in lateral directions of V-shaped block 3. This implies that the stopper 5 resiliently snug fits on the block 3 or can be applied thereto in an automatic manner by simply straight-forwardly pushing it from outside of block 3 in the radial direction. Accordingly, by use of a radially inward motion it is possible to concurrently apply a plurality of stoppers 5 to the same number of V-shaped blocks 3 arranged adjacent to each other along metallic belt 2. Therefore, assembly work of V belt 1 can be greatly facilitated.

The lower end parts 5c, 5c at both sides of stopper 5 automatically snap into the locking slots 3g, 3g of V-shaped block 3 when stopper 5 is radially inwardly pushed down by a predetermined distance from an outer position. At the same time, stopper 5 has the front and rear bent parts 5g, 5g and 5h, 5h of base plate 5a fitted and slid on the front stepped parts 3h, 3h and the rear sides of both shoulder parts of V-shaped block 3, respectively. The shoulder parts of block 3 are chamfered round at both side edges of the top faces thereof, respectively, and both side portions 5b, 5b of stopper 5 have a slightly smaller longitudinal width than the shoulder parts of block 3 and are simple in configuration. Thus, the side portions 5b, 5b smoothly slide along the shoulder parts, thereby being guided snugly. The front and rear bent parts 5g, 5h of stopper 5 serve as positioning pieces at the front and rear of stopper 5, when the stopper 5 is applied to V-shaped block 3. Moreover, the bent parts 5g, 5h function to prevent the stopper 5 from moving unnecessarily in the longitudinal direction of V belt 1, when belt 1 is put in service. Incidentally, such bent parts may be provided at one side only.

The stopper 5 is a pressed mold of steel sheet material as described, and inexpensively available.

However, it also is acceptable to use a similarly shaped stopper manufactured with a round bar material, such as used in manufacturing the stopper shown in in FIG. 13A.

The stopper 5 is inwardly curved at the transversely intermediate part 5d of base plate 5a. However, such base plate may be curved at a plurality of parts thereof in a transversely symmetrical manner, or may be curved as a whole.

All V-shaped blocks 3 and rollers 4 cooperate with each other to constitute a loop which as a whole has a necessary play or clearance along the length of V belt 1. However, it will be understood that in applications in which V belt 1 is stretched over the driving pulley 100 and driven pulley respective plays between the V-shaped blocks 3 are changed.

For a looped metallic belt 2 having a given length and with given numbers of V-shaped blocks 3 and rollers 4, the block-and-roller loop has a total play depending on the outside diameter of the respective rollers 4 and the minimum longitudinal thickness of the respective blocks 3.

Figure 8:
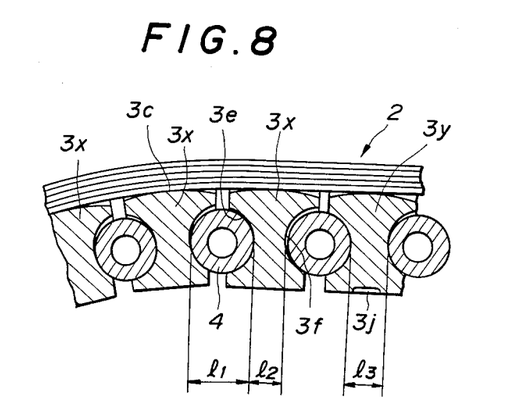
FIG. 8 is a sectional side view of an essential part of the V belt.

As shown in FIG. 8, the rollers 4 are all of a type having a predetermined outside diameter $l_1$. The sintered metallic V-shaped blocks 3 fall into two types: a first type of which each V-shaped block is designated by reference number 3x and has as its minimum longitudinal thickness a predetermined dimension $l_2$, and a second type of which each V-shaped block is designated by reference number 3y and has as its minimum longitudinal thickness a predetermined dimension $l_3$, where $l_3$ is larger than $l_2$. Because the rollers 4 all have the same outside diameter $l_1$, the total play of the block-and-roller loop as initially set depends on the proportion of the number of V-shaped blocks 3x of the first type (alternately that of V-shaped blocks 3y of the second type) in use to the total number of V-shaped blocks 3. In this respect, the blocks 3x, 3y are sintered ones and can be easily manufactured with a high dimensional accuracy.

There will be described below how V belt 1 is initially assembled for the total play of block-and-roller loop to be a predetermined value Pr.

First, V belt 1 as assembled with metallic belt 2, rollers 4, and only V-shaped blocks 3x of the first type is measured to determine a total play Pm of block-and-roller loop, as it then has. Practically, Pm is larger than Pr. Then, N V-shaped blocks 3x are replaced with the same number of V-shaped blocks 3y of the second type, where N is a nearest integer to a number n such that:

$$n = (Pm - Pr)/(l_3 - l_2).$$

By such disposition an initial value is set for the required total play Pr.

The length of metallic belt 2 slightly increases with time of use, resulting in a total play of the block-and-roller loop in excess of the required value Pr, thus necessitating a repairing for adjustment of V belt 1. In such case, V belt 1 is disassembled to replace a number of V-shaped blocks 3x of the first type with the same number of V-shaped blocks 3y of the second type, as necessary. As shown in FIGS. 3, 4 and 8, each V-shaped block 3y of the second type includes a visual identification mark which can be easily recognized from outside in an assembled state of V belt 1. The depicted mark is a longitudinal groove or slit 3i at the radially inner side as well as a transverse groove or slit 3j at the radially inner side. Thus, the V-shaped blocks 3y of the second type can be easily distinguished from the V-shaped blocks 3x of the first type. Therefore, the repairing adjustment operation can be performed with ease by simply taking out nothing but the necessary number of V-shaped blocks 3x of the first type and replacing these with the same number of V-shaped blocks 3y of the second type.

In the V belt 1, V-shaped blocks 3x, 3y of the two types having the minimum longitudinal thicknesses $l_2$, $l_3$ different from each other are used rather than a single type of V-shaped block, as is conventionally done. Further, V-shaped blocks 3y of either type are provided with marks 3i, 3j visually identifiable from outside, so that only the V-shaped blocks 3x to be replaced can be selected to be taken out of V belt 1, when necessary for repairing for adjustment of the total play of the block-and-roller loop, as increased due to extension of metallic belt 2 with time of use. As a result, in the repairing for adjustment process, V belt disassembly and reassembly work is possibly facilitated. Likewise, a facilitation is possibly achieved with respect to the final adjustment of the total play of the block-and-roller loop in initial fabrication of the V belt.

Moreover, V-shaped blocks 3x, 3y of the two types are all sintered ones which can be easily manufactured to dimensions of high accuracy and, hence, the total play of block-and-roller loop can be adjusted with a high precision.

As well as V-shaped blocks 3y of the second type, V-shaped blocks 3x of the first type may be provided with a mark visually identifiable from outside. Or otherwise, only the V-shaped blocks 3x of the first type may have a mark, instead of giving marks 3i, 3j to the V-shaped blocks 3y of the second type.

Figures 9, 10:
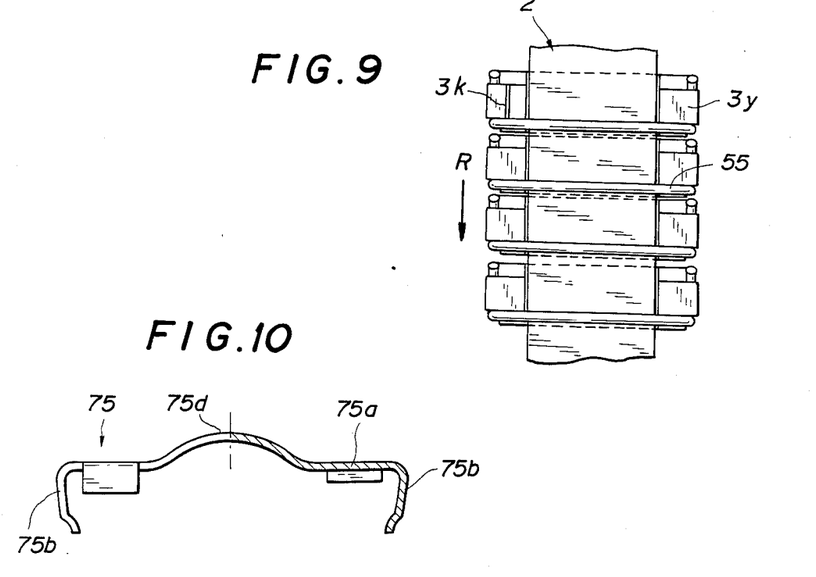
FIG. 9 is an illustration showing a first modification of a V-shaped block.
FIG. 10 is an illustration showing a modified example of a stopper.

FIG. 9 shows a first modification of V-shaped block. A stopper is made by use of a round bar material 55 as shown, and a longitudinal groove 3k visually identifiable from outside in the radial direction is formed in the radially outer side of a V-shaped block 3y of a second type.

FIG. 10 shows a modified example of a stopper. There is illustrated a stopper 75 which is different from the stopper 5 of FIGS. 5 to 7 in that its base plate 75a is radially outwardly curved at a transversely central part 75d thereof. Also, the stopper 75 is easily resiliently deformed so that it has both side portions 75b, 75b thereof uniformly spread in lateral directions of the V-shaped block 3. Thus, like stopper 5, the stopper 75 can be easily applied to V-shaped block 3.

Figure 11:
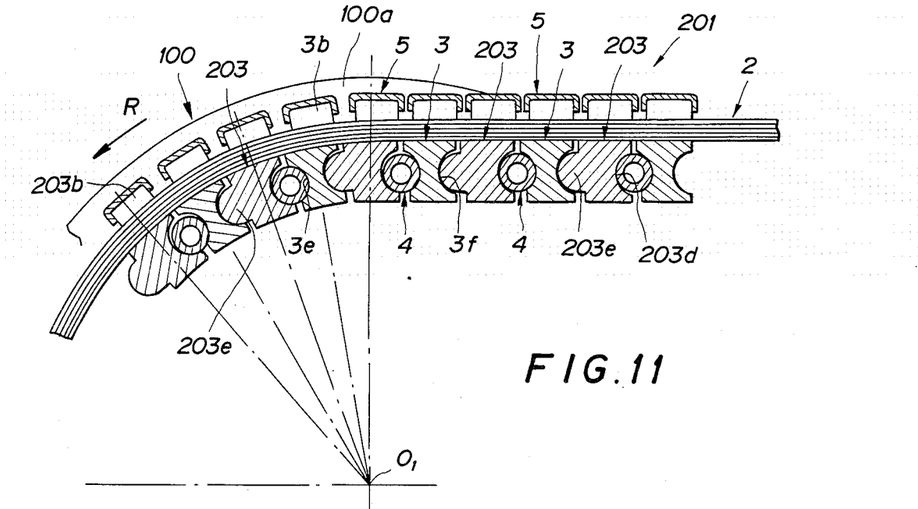
FIG. 11 is a sectional side view of a part of a V belt employing a second modification of a V-shaped block, as it is brought into engagement with a driving pulley.
Figure 12A:
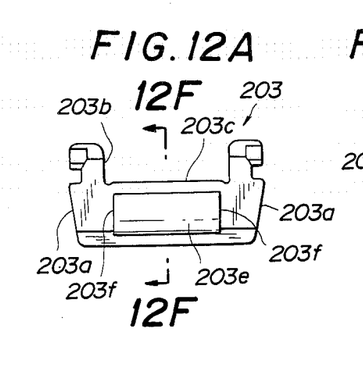
FIGS. 12A to 12E are front, side, rear, plan and bottom views of a V-shaped block of FIG. 11
Figures 12B, 12C:
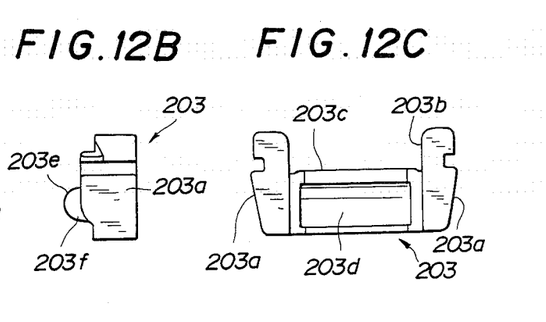
Figure 12D:
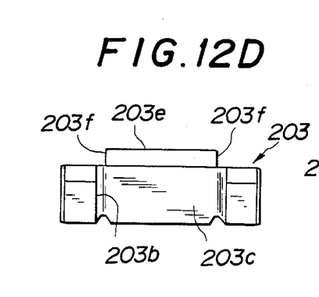
Figures 12E, 12F:
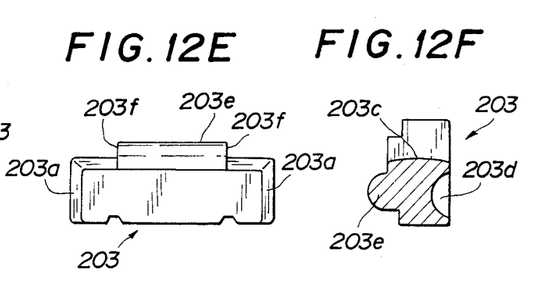
FIG. 12F is a sectional view of same along line 12F—12F of FIG. 12A, respectively.

In FIG. 11, there is shown a V belt 201 using V-shaped blocks 203 according to a second modification. Like parts are designated by like reference numbers to the first embodiment of the invention. In contrast to the first embodiment using V-shaped blocks 3x, 3y of the first and second types, the V-shaped blocks 203 will be called as ones of a third type, and the V-shaped blocks 3x, 3y simply as V-shaped blocks 3 without particular distinction. As a fundamental point, the V-shaped blocks 203 of the third type are different from the V-shaped blocks 3 in that a convex part 203e, with a function of a roller, is formed in place of a roller receiving concave place at the front thereof. Designated at reference character $O_1$ is the center of rotation of a driving pulley 100.

Each V-shaped block 203 of the third type, which is also made by sintering, has at both sides thereof a pair of surfaces 203a, 203a inclined to engage, as they come into contact, with a V-grooved face 100a of pulley 100, and a wide concave groove 203b on which a looped metallic belt 2 faces. The concave groove 203b opens outwardly. The radially inner side of the metallic belt 2 abuts on a radially outer side 203c of the concave groove 203b. Radially inside of the loop of belt 2, each V-shaped block 203 has at the front face thereof in the longitudinal direction a semi-cylindrical convex part 203e integrally formed thereon and at the rear face thereof a semi-cylindrical concave place 203d for receiving to hold a corresponding one of the rollers 4. As shown in FIGS. 12A to 12F, the convex part 203e is flat at both sides thereof and has the same radius of curvature as roller 4, so it plays the role of a roller. Also, the radius of curvature of the concave place 203d is equal to that of roller 4.

In the modification shown, the V-shaped blocks 3 and the V-shaped blocks 203 of the third type are alternately arranged one by one, with a corresponding one of the rollers 4 intervening between the concave place 203d at the rear face of each V-shaped block 203 and a concave place 3e at the front face of a posterior one of the V-shaped blocks 3. The convex part 203e of each V-shaped block 203 is oriented in a rotating direction R of the driving pulley 100 to engage with a concave place 3f at the rear face of an anterior one of the V-shaped blocks 3.

In use, the V belt 201 runs in the direction R so that V-shaped blocks 3 and V-shaped blocks 203 of the third type alternately come into contact with, wedging into the V-grooved face 100a of pulley 100. V-shaped blocks 203 of the third type each respectively integrally move with the convex part 203e, when caused to incline, and thus they can start engaging with the V-grooved face 100a in a smoother manner than would be possible with a roller put at the front.

The V belt 201 uses the V-shaped blocks 203 of the third type each having on the front fcae thereof the convex part 203e serving as a roller. Therefore, the number of rollers 4 is permitted to be reduced, making the V belt assembly work all the more facilitated. Since V-shaped blocks 3 and V-shaped blocks 203 are alternately arranged one by one, the number of rollers 4 can be reduced half in comparison with the V belt 1, so that the assembly work of roller 4 also can be reduced half.

It is not necessarily required to alternatively arrange V-shaped blocks 3 and V-shaped blocks 203 one by one. For example, there may be employed an arrangement in which V-shaped blocks 3 each respectively appear at every third place, with pair of V-shaped blocks 203 of the third type put at the remaining places.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

I claim:

1. A V belt for power transmission to be stretched over a driving pulley and a driven pulley to effect power transmission therebetween, said V belt comprising:
   a looped metallic belt;
   a plurality of V-shaped metallic blocks fitted on said metallic belt in a continuous manner along the length of said metallic belt, said V-shaped blocks each having at the upper part thereof a concave groove radially outwardly opening of said V belt so that said metallic belt faces thereon; and
   a plurality of stoppers each having a base portion extending widthwise of said V belt and side portions radially inwardly extending either at each side of said base portion, said stoppers each respectively adapted to be fitted, at both side portions thereof, from outside in the radial direction of said V belt onto one of said V-shaped blocks to secure the V-shaped block to said metallic belt, wherein:
   at least a part of said base portion of each stopper is curved in a radial direction of said V belt to permit a resilient uniform opening of both said portions thereof in lateral directions.

2. A V belt according to claim 1, wherein:
   said curved part of said base portion of each stopper is radially inwardly curved.

3. A V belt according to claim 1, wherein:
   said curved part of said base portion of each stopper is radially outwardly curved.

4. A V belt according to claim 1, wherein:
   said curved part of said base portion of each stopper is a widthwise intermediate part of said base portion.

5. A V belt according to claim 2, wherein:
   said curved part of said base portion of each stopper is a widthwise intermediate part of said base portion.

6. A V belt according to claim 1, wherein:
   said V-shaped blocks are each formed at both sides thereof with locking slots extending longitudinally of said V belt; and
   respective lower end parts of said side portions of each stopper are bent to curve widthwise inwardly of said V belt to engage with said locking slots of one of said V-shaped blocks.

7. A V belt according to claim 1, wherein:
   said base portion of each stopper is provided at at least one of front and rear edges thereof with a bent part radially inwardly directed of said V belt so as to be abuttable on a front or rear face of one of said V shaped blocks.

8. A V belt according to claim 1, wherein:
   said V-shaped blocks are each formed with stepped parts at front parts of both shoulder parts thereof, respectively; and
   said base portion of each stopper is provided at left and right portions of front and rear edges thereof with bent parts radially inwardly directed of said V belt, respectively, said bent parts at the front edges of the stopper abutting on said stepped parts of the V-shaped blocks and said bent parts at the rear edges of the stopper abutting on the rear sides of said shoulder parts of the V-shaped block.

9. A V belt according to claim 1, wherein:
   said stoppers each comprise a mold of steel sheet material.

* * * * *

UNITED STATES PATENT AND TRADEMARK OFFICE
CERTIFICATE OF CORRECTION

PATENT NO. : 4,758,211

DATED : July 19, 1988

INVENTOR(S) : HATTORI

It is certified that error appears in the above-identified patent and that said Letters Patent is hereby corrected as shown below:

```
Column 3, line 66, after "achieved to" insert --give an
effective solution to--;
          line 67, delete "give an effective solution to".
Column 5, line 4, correct the spelling of --shaped--.
Column 6, line 12, change "to there" to --thereto--.
Column 9, line 19, change "l₃different" to --l₃ different--.

Column 10, line 46, change "fcae" to --face--;
           line 58, change "pair" to --pairs--.
Column 12, line 18 (claim 7, line 6), change "V shaped" to
--V-shaped--;
           line 30 (claim 8, line 12), change "block" to
--blocks--.
```

Signed and Sealed this

Sixth Day of December, 1988

Attest:

DONALD J. QUIGG

Attesting Officer

Commissioner of Patents and Trademarks